Sept. 20, 1927.
H. S. SPACKMAN
1,643,136
PROCESS OF MANUFACTURING CEMENTITIOUS MATERIAL
Filed Sept. 22, 1923
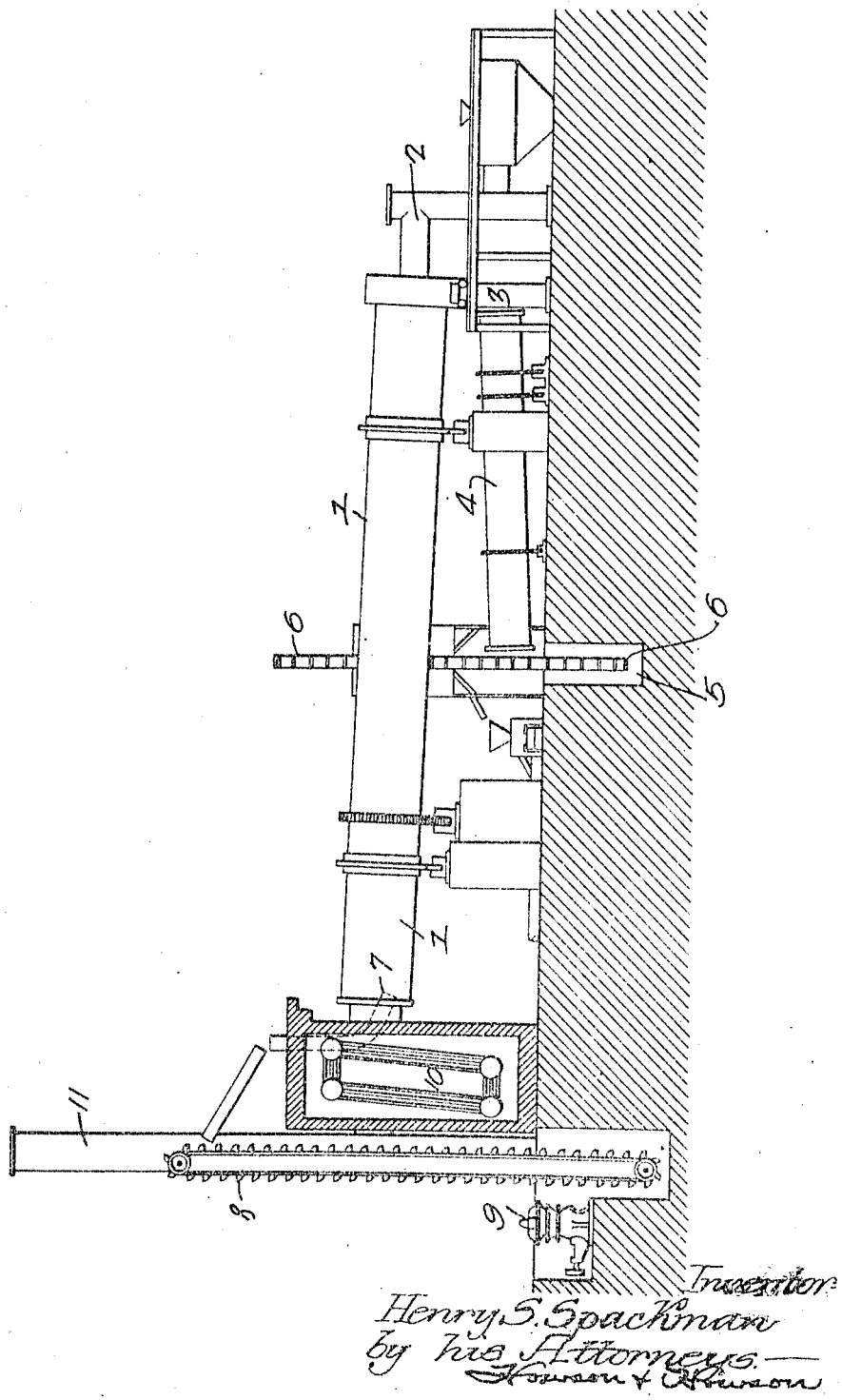
Inventor
Henry S. Spackman
by his Attorneys
Howson & Howson Patented Sept. 20, 1927.

1,643,136

UNITED STATES PATENT OFFICE.

HENRY S. SPACKMAN, OF ARDMORE, PENNSYLVANIA.

PROCESS OF MANUFACTURING CEMENTITIOUS MATERIAL.

Application filed September 22, 1923. Serial No. 664,253.

This invention relates particularly to the manufacture in furnaces or kilns of the rotary type, of cements of the kind commonly known as aluminate cements, that is cements in which the alumina exceeds the silica and in which the lime present after deducting that combined with the silica and other acid acting elements is only sufficient to combine with alumina in ratios from $5Al_2O_3, 3CaO$ to $CaOAl_2O_3$.

One object of the invention is to provide a practical, economical and efficient process for producing low lime aluminous cements.

The rotary kiln as customarily used for the calcination of Portland cement, lime, etc., consists of a hollow revolving cylinder lined with a refractory material and so mounted that it is inclined from its feeding to its discharge end, the incline causing the charge of material fed into its upper end to move progressively through it as it revolves. The steepness of the incline as in general use varies from one-quarter inch to three-quarters of an inch to the foot.

Such rotary kilns customarily vary in diameter from six to twelve feet and their length is usually from one hundred to two hundred and fifty feet. But in general the length bears a definite relation to the internal diameter, i. e.,—the distance between opposite portions of the refractory lining. If the dry process is employed, the ratio of diameter to length is customarily equal to or greater than one to fifteen. When the wet process is used, and the material to be calcined is mixed with water prior to being fed to the kiln, the ratio of the diameter to the length is customarily equal to or greater than one to twenty.

While kilns of the above noted general character have been standard in the Portland cement industry, in spite of numerous experiments they have not heretofore been found practicable for the commercial production of low lime high aluminous cements. Such cements by reason of their markedly different chemical composition, have a relatively small temperature range between the point of incipient fusion and the actual melting point. This temperature range is commonly considered to cover less than 50° F. As a consequence, when attempts have been made to calcine low lime high aluminous cements in a rotary kiln in the usual manner, it has been found impossible to so control the temperature as to maintain it constantly within the narrow range permitted. This not only gives an unsatisfactory product due to lack of uniformity, but affects the mechanical operation of the kiln which rings up badly. This ringing interferes with the uniform passage of the material through the kiln, thereby cutting down the draft and greatly lowering its output, not only by reason of the relatively small amount of material passed through the kiln, but also because of the necessary and frequent shutting down and cooling of the kiln in order to permit the manual cutting out of the rings that have been formed. Such irregular operation, besides resulting in a reduced output of unsatisfactory material, greatly increases the amount of fuel required for the production of a barrel of cement and likewise materially increases the labor costs. As a consequence, smelting furnaces have been customarily used for the commercial manufacture of low lime high aluminous cements.

Owing to the much higher lime content of Portland cements which causes the material to attack the ordinary fire brick linings when the heat in the kiln is raised sufficiently high to fuse the materials therein, fusion in rotary kilns has not been resorted to in the manufacture of Portland cement. I have discovered, however, that owing to its low lime content, low lime high alumina cement can be brought to a state of fusion in a rotary kiln without serious danger or damage to the lining thereof, and that when in calcining low lime high alumina cement, the temperature is carried sufficiently high to produce fusion, it is possible to produce a uniform cement, with little or no trouble from ringing. In using the term "fusing" in this specification I have intended to define the condition of fluidity resulting from the action of heat and in which the charge flows sufficiently freely to become thoroughly mixed and substantially homogenous as a result of agitation caused by the rotation of the furnace and in which it is free from a tendency to agglomerate or adhere to the sides of the kiln in large masses. The temperature required for bringing the charge to this condition will vary widely with its composition, but in general it may be stated that this temperature will range between approximately 2500° and 3000° F. I have also discovered that by reducing the length of the kiln and operating it at a suitable temperature, as hereinbefore described, certain advantages are gained in the way of more uniform operation and reduction or substantially complete elimination of ringing. Such reduction in length of the kiln seems to proportionately reduce the length of the high temperature zone and likewise causes any rings that may be formed from time to time to appear closer to the discharge end of the kiln where they may be conveniently removed by poking out with iron bars and without the necessity for shutting down the kiln. I have also found that the substitution of oil for powdered coal as fuel tends to shorten the high temperature zone and reduce the ringing.

In practice, I may use any suitable combination of apparatus such for example as that shown in the accompanying drawings, in which, The figure is an elevation, to some extent diagrammatic, illustrating one form of apparatus in which my invention may be carried out.

In the above drawing, 1 represents a rotary cement kiln whose length is preferably such that it is substantially equal to ten times its internal diameter. This kiln is supplied with fuel oil suitably mixed with a proper proportion of air through a burner 2 and the lower end of said kiln is provided with a stationary housing 3 through which calcined material falls into a suitable rotary cooler 4. The cooled and solidified material from the lower end of the cooler 4 is delivered into a pit 5 from which it is removed by a conveyor 6.

The upper end of the kiln 1 is supplied with a suitable mixture of raw materials from a chute 7 to which said material is delivered by a conveyor 8 from a crusher 9 or other suitable source. This upper or receiving end of the kiln 1 is connected to deliver products of combustion to one or more boilers 10 for utilizing what would otherwise be waste heat and these boilers are connected to a stack 11.

In accordance with my invention, the raw material consisting, for example, of bauxite and lime is fed into the kiln preferably after mixing with water, as in the wet process for making Portland cement, so that it minimizes dust losses which otherwise are apt to be serious owing to the greater cost of the raw materials used in producing low lime high aluminous cements. In a typical case, I may use as raw material substantially equal parts of bauxite and lime of average composition, which when burned in accordance with my invention will produce in a typical case a cement containing silica 6%, alumina 41%, iron oxide 11%, lime 41% and undetermined material 1%. The fuel is supplied in such quantities that the temperature of the kiln is maintained sufficiently high to cause fusion of the raw material. As shown in the drawings, it is preferable in order to reduce the fuel cost, to recover a portion of the heat carried off by the products of combustion by the use of waste heat boilers 10 at the stack end of the boiler, since said products, (owing to the shorter length of the kiln) will leave it at a considerably higher temperature than would be the case if longer kilns were used. A further saving in fuel consumed is also obtained by delivering to the kiln the heated air from the cooler 4.

While in the foregoing description, I have specified the length of kiln equal to ten times its diameter, it is to be understood that without departing from my invention this ratio is preferably made much less, for example, where heat is recovered by the use of boilers the length of the kiln may be from five to six times its diameter.

I claim:

1. The process of producing low lime high aluminous cements which comprises fusing a mixture of lime and aluminous material while this is being rotated.

2. The process of producing low lime high aluminous cements which comprises fusing a mixture of lime and aluminous material while this is being rotated, said materials being so proportioned that the amount of lime is substantially that required to combine by weight in a monocalcic ratio with the acid acting elements present.

3. The process of producing low lime high aluminous cements which comprises fusing in a rotary kiln a mixture of lime and aluminous materials so proportioned that the lime is present in an amount substantially that required to combine by weight in a monocalcic ratio with the acid acting elements,—the length of the kiln not exceeding ten times its internal diameter.

4. The process of producing low lime high aluminous cements which comprises fusing a mixture of lime and aluminous material while this is being rotated in a kiln whose length does not exceed ten times its internal diamter.

5. The process of producing low lime high aluminous cements which comprises rotating a mixture of bauxite and lime in a heated atmosphere until the mixture is fused.

HENRY S. SPACKMAN.